US009471295B2

(12) United States Patent
Baraldi et al.

(10) Patent No.: US 9,471,295 B2
(45) Date of Patent: Oct. 18, 2016

(54) METHOD, DEVICE AND COMPUTER PROGRAM FOR THE AUTOMATIC INSTALLATION OR UNINSTALLATION OF SOFTWARE MODULES ON EQUIPMENT ON BOARD AN AIRCRAFT

(71) Applicant: Airbus Operations (SAS), Toulouse (FR)

(72) Inventors: Thierry Baraldi, Plaisance du Touch (FR); William Barsse, Blagnac (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 14/206,758

(22) Filed: Mar. 12, 2014

(65) Prior Publication Data
US 2014/0282491 A1     Sep. 18, 2014

(30) Foreign Application Priority Data

Mar. 12, 2013   (FR) ...................................... 13 52201

(51) Int. Cl.
*G06F 9/445*     (2006.01)
*G06F 9/44*     (2006.01)

(52) U.S. Cl.
CPC . *G06F 8/61* (2013.01); *G06F 8/62* (2013.01); *G06F 8/65* (2013.01); *G06F 8/71* (2013.01)

(58) Field of Classification Search
CPC .............................................. G06F 8/60–8/70
USPC .................................................. 717/168–178
See application file for complete search history.

(56) References Cited

U.S. PATENT DOCUMENTS 3,969,723 A * 7/1976 Kennicott ................. G06F 8/67
700/83
5,307,505 A * 4/1994 Houlberg .............. G06F 15/177
370/402

(Continued)

FOREIGN PATENT DOCUMENTS

EP          0592079       4/1994
FR          2972821       9/2012

OTHER PUBLICATIONS

Conmy, Philippa, Mark Nicholson, and John McDermid. "Safety assurance contracts for integrated modular avionics." Proceedings of the 8th Australian workshop on Safety critical systems and software—vol. 33. Australian Computer Society, Inc., 2003.*

(Continued)

*Primary Examiner* — Matthew Brophy
(74) *Attorney, Agent, or Firm* — Greer, Burns & Crain Ltd.

(57) ABSTRACT

The automatic installation and uninstallation of software modules on equipment on an aircraft. For each reference of an obtained list of references of software modules to be installed or uninstalled, resolution rules linked to an operation associated with the software module in question are identified. The rules comprise at least one reference to an operation of installing or uninstalling at least the software module in question and a list of actions to be performed. For each reference on the obtained list, a list of references of operations to be carried out is determined depending on the obtained list and the identified resolution rules. A list of actions to be performed is determined depending on the list of references of operations to be carried out and the identified resolution rules. At least one referenced action on the list of actions to be performed is executed by calling a specific software agent.

7 Claims, 3 Drawing Sheets

(56) References Cited

U.S. PATENT DOCUMENTS

| | | | |
|---|---|---|---|
| 5,390,356 A * | 2/1995 | Houlberg | G06F 15/177 703/23 |
| 5,555,416 A | 9/1996 | Owens et al. | |
| 5,721,824 A * | 2/1998 | Taylor | G06F 8/61 709/203 |
| 6,698,018 B1 | 2/2004 | Zimniewicz et al. | |
| 6,725,452 B1 * | 4/2004 | Te'eni | G06F 8/61 717/168 |
| 6,904,471 B2 | 6/2005 | Boggs | G06F 11/3636 326/40 |
| 7,149,792 B1 * | 12/2006 | Hansen | G06F 8/65 709/220 |
| 8,055,393 B2 * | 11/2011 | Sims et al. | 701/3 |
| 2001/0044684 A1 * | 11/2001 | Kohge | G06F 8/66 701/41 |
| 2004/0019876 A1 * | 1/2004 | Dravida | H04L 12/2801 717/117 |
| 2004/0031029 A1 * | 2/2004 | Lee | G06F 8/65 717/171 |
| 2005/0065670 A1 * | 3/2005 | Tripmaker | G06F 8/65 701/3 |
| 2005/0132350 A1 * | 6/2005 | Markley et al. | 717/168 |
| 2005/0177829 A1 | 8/2005 | Vishwanath | |
| 2005/0192979 A1 * | 9/2005 | Keller | G06F 8/61 |
| 2006/0010438 A1 * | 1/2006 | Brady et al. | 717/174 |
| 2006/0229772 A1 * | 10/2006 | McClary | G06F 8/64 701/3 |
| 2007/0277130 A1 * | 11/2007 | Lavelle | 716/4 |
| 2008/0127041 A1 * | 5/2008 | Gura | G06Q 10/06 717/101 |
| 2008/0189696 A1 * | 8/2008 | De Sutter et al. | 717/168 |
| 2009/0138517 A1 * | 5/2009 | McLain et al. | 707/104.1 |
| 2009/0138550 A1 * | 5/2009 | Pageron | G06F 8/60 709/203 |
| 2009/0138871 A1 * | 5/2009 | Kimberly et al. | 717/173 |
| 2009/0138872 A1 * | 5/2009 | Fuchs et al. | 717/173 |
| 2009/0138873 A1 * | 5/2009 | Beck et al. | 717/173 |
| 2009/0138874 A1 * | 5/2009 | Beck et al. | 717/173 |
| 2009/0187976 A1 * | 7/2009 | Perroud et al. | 726/4 |
| 2009/0307678 A1 * | 12/2009 | Wu | G06F 8/65 717/168 |
| 2009/0328023 A1 * | 12/2009 | Bestland | G06F 8/65 717/168 |
| 2010/0023602 A1 * | 1/2010 | Martone | G06F 8/60 709/220 |
| 2010/0235289 A1 * | 9/2010 | Frayssignes et al. | 705/304 |
| 2010/0287545 A1 * | 11/2010 | Corbefin | 717/174 |
| 2010/0333109 A1 * | 12/2010 | Milnor | 718/106 |
| 2011/0126197 A1 * | 5/2011 | Larsen et al. | 718/1 |
| 2011/0167420 A1 * | 7/2011 | Bastien | 717/173 |
| 2012/0017200 A1 * | 1/2012 | Ghosh et al. | 717/126 |
| 2012/0096433 A1 * | 4/2012 | Reinhold et al. | 717/120 |
| 2012/0240108 A1 * | 9/2012 | Baraldi et al. | 717/176 |
| 2013/0024850 A1 * | 1/2013 | Nutaro et al. | 717/169 |
| 2013/0067450 A1 * | 3/2013 | Saugnac | 717/170 |

OTHER PUBLICATIONS

Dordowsky, Frank, Richard Bridges, and Holger Tschope. "Implementing a software product line for a complex avionics system." Software Product Line Conference (SPLC), 2011 15th International. IEEE, 2011.*

Manolios, Panagiotis, Daron Vroon, and Gayatri Subramanian. "Automating component-based system assembly." Proceedings of the 2007 international symposium on Software testing and analysis. ACM, 2007.*

French Search Report, Nov. 6, 2013.

* cited by examiner

Fig. 4

METHOD, DEVICE AND COMPUTER PROGRAM FOR THE AUTOMATIC INSTALLATION OR UNINSTALLATION OF SOFTWARE MODULES ON EQUIPMENT ON BOARD AN AIRCRAFT

CROSS-REFERENCES TO RELATED APPLICATIONS

This application claims the benefit of the French patent application No. 1352201 filed on Mar. 12, 2013, the entire disclosures of which are incorporated herein by way of reference.

BACKGROUND OF THE INVENTION

The present invention relates to updating software modules in equipment and more particularly a method, a device and a computer program for the automatic installation or uninstallation of software modules in equipment on board an aircraft.

Modern aircraft increasingly comprise electronic and computerized systems to improve their performance and to assist the pilot as well as the crew members with their tasks. Thus, for example, electric flight controls reduce the mechanical complexity of the transmission of commands to the actuators, and therefore the mass associated with these controls. Similarly, the presentation of relevant information makes it possible for the pilot to optimize flight paths and to respond rapidly to any detected incident. Such information is in particular the speed, position and course and meteorological and navigation data. Taken together, these electronic and computerized systems are generally known as the avionics.

For reasons of reliability, the avionics have often been distributed according to their function, in specific modules also known as LRU (Line Replaceable Unit). In this architecture, a point-to-point transmission mode is used between each module. Thus, for example, the flight controls are managed in a particular device while the electricity supply is managed in another. A specific function is thus associated with each module.

Furthermore, each module supporting a critical function is, preferably, redundant so that failure of a module does not result in the loss of the associated function. Operating an aircraft using a redundant module when the main module has failed can require a maintenance operation.

In order to improve aircraft functionalities, reduce the weight of the electronic equipment by means of greater integration, reduce the costs by using generic modules, and facilitate maintenance operations, the avionics are now increasingly integrated in an architecture known as IMA (Integrated Modular Avionics). In this architecture, as far as possible the functionalities of the avionics systems use generic calculation and input/output resources for their implementation. These resources are distributed in items of equipment that each comprise numerous software modules. A system of segregation or partitioning makes it possible to isolate each of the functionalities so that the failure of one function has no effect on another.

Within each item of equipment of the aircraft, software modules are loaded and updated by an operative who is present on board the aircraft to perform these operations. The role of the operative is in particular to launch the loading of these modules or updates and to verify that the selected configuration has been satisfactorily loaded onto the equipment.

These operations are typically performed by using a centralized loading system that makes it possible to address all of the remotely loadable items of equipment.

Figure 1:
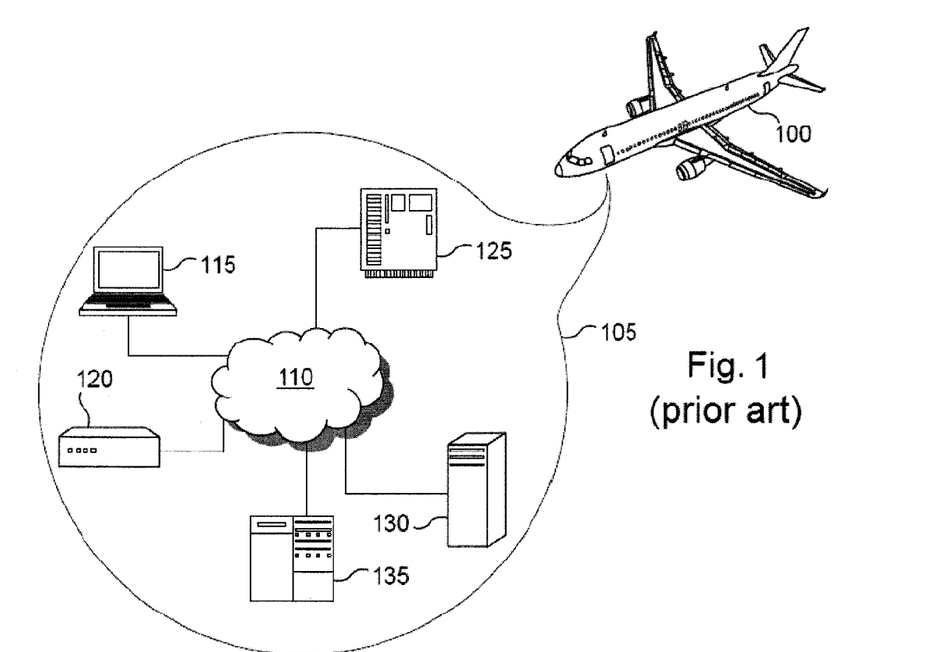
FIG. 1 shows an example aircraft comprising a standard on-board information processing system.

FIG. 1 shows an example aircraft 100 comprising an on-board information processing system 105. The system 105 itself comprises a communication network 110, for example a communication network conforming to the AFDX™ standard (Avionic Full DupleX), to which are connected items of equipment referenced here 115 to 135. Among said items of equipment, some may have a particular role in the context of the loading and updating of software modules on the equipment. Thus, for example, the item of equipment 115 can comprise a software module providing a centralized loading system function allowing all of the items of remotely loadable equipment to be addressed, in particular itself. Still by way of illustration, the item of equipment 120 can be used as a storage location, also known as repository, for storing the software modules to be installed on equipment. The item of equipment 120 then typically comprises a reading device, for example a memory card drive or a DVD drive, allowing software modules originating from equipment manufacturers to be transferred to the storage location.

The software modules are generally provided by equipment manufacturers in the form of loads, i.e., sets comprising applications or software functions as well as security elements allowing said applications or software functions to be authenticated, i.e., to demonstrate their integrity and origin.

The operations to be carried out by an operative for loading the equipment can be different from one item of equipment to another, in particular depending on constraints specific to certain items of equipment. Such constraints can be multiple. They can relate, for example, to the order in which installations or deletions are performed. They are linked to the complexity of the software modules and their interactions.

In order to take account of said constraints, the designers of the on-board information processing systems generally write procedures which must be followed by the operatives during the software module loading and updating operations. However, such procedures make the operatives' operations more complex and are time-consuming, constituting a potential source of problems linked to operator errors.

In order to limit said problems, constraints can be met by using batch processing functions. A batch function is here a function allowing the automatic installation of software modules in a given order. However, said function does not allow for all types of constraints. Moreover, batch functions can be regarded as transferring procedures. Consequently, the use of batch functions instead of procedures merely moves part of the complexity linked to the operatives' procedures to the programming of the batch functions. Finally, the number of batch functions to be carried out is linked directly to the number of possible cases of loading of the software modules, which is prohibitive for a standard solution. Moreover, the use of batch functions does not allow all of the constraints to be resolved, in particular constraints between systems and constraints linked to actions to be performed before or after the update.

There is thus a need, in on-board systems, in particular the on-board systems of aircraft, to automate the installation of software module updates and manage the constraints linked to said installations, allowing uniform procedures to be defined for the operatives in charge of said operations. Management of the constraints should not, preferably, require modification of the loads generated by equipment manufacturers to ensure that it is unnecessary to modify the existing loads (so that the existing loads can be used without modification).

The invention makes it possible to solve at least one of the problems set out above.

SUMMARY OF THE INVENTION

The invention thus relates to a computerized method for the installation or uninstallation of at least one software module in an on-board item of equipment of a system comprising a plurality of on-board items of equipment, at least one operation being associated with said at least one software module, said method being implemented in an item of equipment separate from said equipment on which said at least one software module must be installed or uninstalled and comprising the following steps, obtaining a list of at least one reference of a software module to be installed or uninstalled;

for each reference of a software module from the obtained list, identifying resolution rules linked to an operation associated with the software module in question, said resolution rules comprising at least one reference to an operation of installation or uninstallation of at least the software module in question on an on-board item of equipment of said system and a list comprising at least one reference of an action to be performed and determining a list of at least one reference of an operation to be carried out depending on said obtained list and said identified resolution rules;

determining a list of at least one reference of an action to be performed depending on said list of at least one reference of an operation to be carried out and said identified resolution rules; and executing at least one referenced action in said list of at least one reference of a determined action to be performed, the execution of said at least one referenced action calling a software agent specific to an item of equipment separate from said equipment implementing said method.

The method according to the invention thus makes it possible to standardize the procedures of installation and uninstallation of software modules on aircraft equipment. It also allows the execution of operations on the environment of the equipment, in particular before, during and/or after the actual loading itself. It also makes it possible to carry out operations in parallel in order to save time.

According to a particular embodiment, the method also comprises a step of verifying the completeness of said obtained list of at least one reference of a software module to be installed or uninstalled depending on said identified resolution rules.

Still according to a particular embodiment, the method also comprises a step of identifying at least one missing software module necessary for the installation or uninstallation of said at least one software module, no reference to said at least one missing software module appearing in said obtained list of at least one reference of a software module to be installed or uninstalled, and a step of adding a reference to said at least one missing software module to said obtained list of at least one reference of a software module to be installed or uninstalled.

Still according to a particular embodiment, the method also comprises a step of determining a list of at least one reference of an achievable operation, said at least one reference of an achievable operation belonging to said list of at least one reference of an operation to be carried out.

According to a particular embodiment, the method also comprises a step of determining a list of at least one reference of an operation to be carried out after all the operations for which a reference is included in said list of at least one reference of an operation to be carried out have been completed.

Still according to a particular embodiment, the method also comprises a step of generating a summary of the operations for which a reference included in said list of at least one reference of an operation to be carried out that have been completed.

Still according to a particular embodiment, the method also comprises a step of validation by a user.

The invention also relates to a computer program comprising instructions suitable for the implementation of each of the steps of the previously described method when said program is run on a computer, a device comprising means suitable for the implementation of each of the steps of said method and an aircraft comprising said device.

The advantages provided by said computer program, said device and said aircraft are similar to those mentioned above.

BRIEF DESCRIPTION OF THE DRAWINGS

Further advantages, aims and features of the present invention will become apparent from the following detailed description, given by way of non-limitative example, with reference to the attached drawings, in which.

DETAILED DESCRIPTION OF THE PREFERRED EMBODIMENTS

In general terms, according to a particular embodiment, the invention relates to a centralized loading system making it possible, before performing a loading operation, to verify required initial conditions, suggest to an operative operations that must be carried out before and/or after loading, carry out said actions automatically (after or without confirmation from an operative depending on the configuration), by using agents acting on third party equipment (in the absence of an agent, the loading system can show at the appropriate time the instructions necessary for an operative to carry out the action) and resolve software module loading constraints by indicating to an operative, if necessary, the missing software modules.

Figure 2:
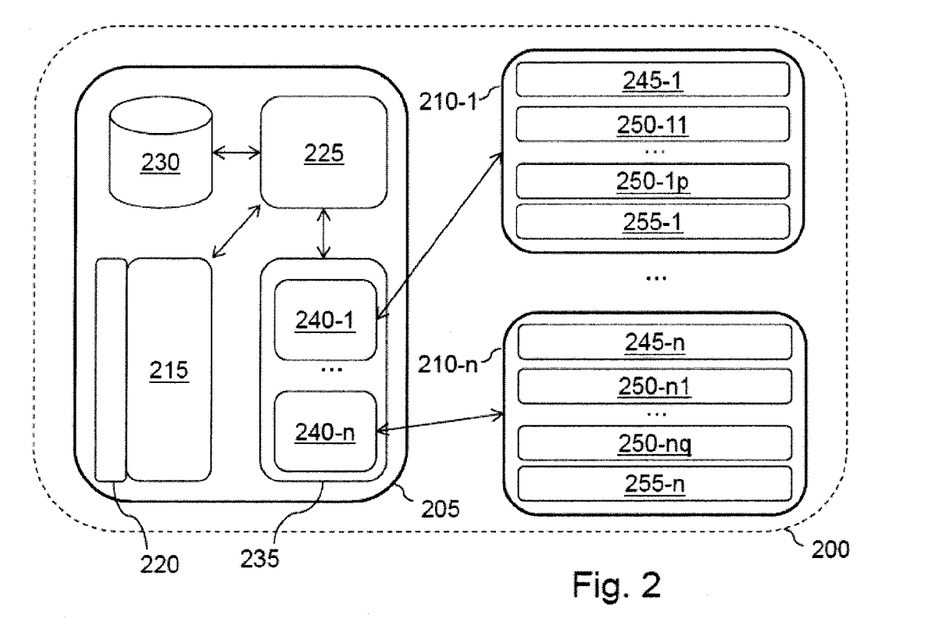
FIG. 2 shows diagrammatically an example architecture of a system allowing the remote loading of software modules onto equipment of an aircraft according to a particular embodiment.

FIG. 2 shows diagrammatically an example architecture of a system allowing the remote loading of software modules onto equipment of an aircraft according to a particular embodiment;

The aircraft information processing system 200 (not shown) here comprises a centralized loading system CLS 205 and items of equipment 210-1 to 210-n onto which the software modules can be loaded remotely.

According to the example shown in FIG. 2, the centralized loading system 205 comprises a management module 215 with which is associated a human-machine interface 220, a resolution engine 225, a database 230 of resolution rules and an actions execution module 235, which itself comprises agents 240-1 to 240-n specific to the equipment of the aircraft comprising the information processing system 200.

The management module 215 is linked to the resolution engine 225 which is itself linked to the database 230 of resolution rules and to the actions execution module 235.

Still according to this example, each item of equipment generically referenced 245 comprises a loading module, here the modules 245-1 and 245-n, modules allowing particular actions to be performed (for example stopping or resetting the equipment, remotely loading a software module or uninstalling a software module), here the modules 250-11 to 250-1p and 250-n1 to 250-nq, and modules allowing the implementation of functions specific to the item of equipment, here the modules 255-1 and 255-n.

The management module 215, via the interface 220, preferably a graphical interface, is an entry point for the user, allowing in particular the selection of a list of software modules (loads) for remote loading onto items of equipment of an aircraft. It drives the resolution engine 225 and informs the user of the progress of the operations, in particular by providing confirmation messages and offering a list of the missing software modules when necessary.

Resolution rules, stored in the database 230, are advantageously defined for each operation, the purpose of an operation being for example the remote loading of a software module onto an item of equipment or the uninstallation of a software module from an item of equipment. The resolution rules are typically defined by:

a list of operations to be carried out before performing the actions defined by the operation involved, named, for example, "operations to be carried out beforehand". Thus, by way of illustration, if, in order to carry out the operation "remotely load software module B", it is necessary to load software module A first, the operation "remotely load software module B" would include "remotely load software module B" on its list of "operations to be carried out beforehand";

a list of actions to be performed ("list of the actions"). These can be of all types and can relate, in particular, to equipment and queries put to a user. Thus, for example, a first action can consist of requesting confirmation from a user that the item of equipment X can be reached while the purpose of a second action is to switch off the item of equipment X and a third action involves the installation of a software module A on an item of equipment Y;

a list of operations to be carried out after having performed the actions defined by the operation involved, named, for example, "operations to be carried out afterwards". According to a particular embodiment, said operations are to be done at least once but have no time constraint and can be shared. By way of illustration, if the operation "install software module A on item of equipment X" requires, after completion, the carrying out of the operation "reset item of equipment X", as well as the operation "install software module B on item of equipment X", the operation "reset item of equipment Y" is carried out as soon as the installation of the software module A or B has finished; and, a list of conditions and constraints ("list of conditions and constraints"). It can in particular comprise the constraint marked, for example, "skip/condition [X]" according to which the operation is not carried out unless the expression [X] is verified. The list can also contain an indication of the "non parallel" type specifying that the actions of the list of actions of the operation cannot be performed in parallel with those of other operations as their execution can cause disruption. Thus, for example, the actions involving the operation "switch off the power supply to the aircraft" result in the inability to carry out operations on other equipment of the aircraft.

An example of resolution rules of an operation is given by way of illustration in the annex (Table 1).

Said example relates to an operation of remote loading of a module A onto an item of equipment X. The list of the operations that must be carried out before performing the actions defined by the operation involved comprises here only the operation consisting of uninstalling the software module B from the item of equipment X. The actions of the operation of remote loading of the module A onto the item of equipment X include a request for user confirmation to open a relay Z, opening said relay if the confirmation is given, installing the software module A on the item of equipment X and closing the relay Z. The list of the operations that must be carried out after having performed the actions defined by the operation involved comprises here only the operation of resetting the aircraft on which the remote loading is performed. As indicated in the list of conditions and constraints, the operation of remote loading of a module A onto an item of equipment X is performed only if the module A is not already installed on the equipment X. Moreover, said operation cannot be performed in parallel with another.

According to a particular embodiment, the resolution rules of each software module, i.e., the corresponding description in its entirety, is provided in or with the software module during its remote loading by the centralized loading system.

Thus, for example, as shown in the annex, Table 2, the resolution rules shown in Table 1 can be associated with a software module X_loadA, associated with an item of equipment X. Said software module comprises a software application for loading onto a target item of equipment, here the item of equipment X, as well as descriptors of operations, here the descriptors "remotely load software module A on item of equipment B" and "uninstall software module A from item of equipment B". Said descriptors make it possible to call resolution rules (e.g. the descriptor "remotely load software module A on equipment B" makes it possible to call description rules bearing the same name).

The resolution engine 225 obtains from the database 230 the resolution rules applicable to the software modules selected by the user. In particular, it verifies the completeness of the list provided by the user, depending on the resolution rules, in particular the operations that must be carried out before or after carrying out the operations of remote loading of the software modules selected by the user, and dependent operations defined in the software modules. The list of the missing software modules is transmitted to the user.

Still based on the resolution rules, it then calculates the list of the elementary actions to be performed, verifies the availability of the agents necessary for performing said actions and schedules their submission to the actions execution module 235 depending on their eligibility (in particular the fulfillment of preconditions and verification of conditions of the skip/condition type). The resolution engine 225 supervises the progress of the execution of the actions and informs the management module 215 thereof.

The actions execution module 235 drives the equipment in charge of executing the requested actions via dedicated agents 240-1 to 240-n. Each agent uses here a specific protocol with the remote module of the equipment concerned. The progress and status of the actions performed are indicated to the resolution engine.

Thus, according to the embodiment previously described, resolution rules are defined for each operation that can be performed. Such rules are, for example, defined by the equipment manufacturers in charge of the development of the corresponding software modules.

According to another embodiment, certain resolution rules are defined generically. It is thus possible to preconfigure the centralized loading system with generic resolution rules, or schemes, that can be used for different operations of a similar nature, such as the loading or uninstallation of a software module on an item of equipment. Thus it is not necessary to re-write similar resolution rules for similar operations.

By way of illustration, it is possible to implement generic resolution rules for loading a software module identified by a PN (Part Number) in an item of equipment identified by an invariant code, known as an FIN (Functional Item Number). When such rules are used, the parameters to which they are applied should be specified, in this case the designation of the software module and the target as well as, if necessary, the dependencies.

According to a particular embodiment, the resolution engine 225 manages several lists, including the following:

the "to do list", which contains all of the operations to be carried out;

the "feasible list", which contains all of the operations to be carried out, the dependencies of which are verified;

the "after list", which comprises all of the operations to be carried out subsequently when the "to do list" and the "feasible list" are empty; and the "completed list", which comprises all the operations already carried out.

As described previously, the resolution engine commands the actions to be carried out by the actions execution module and, when said actions are complete, updates the corresponding lists.

Figure 3:
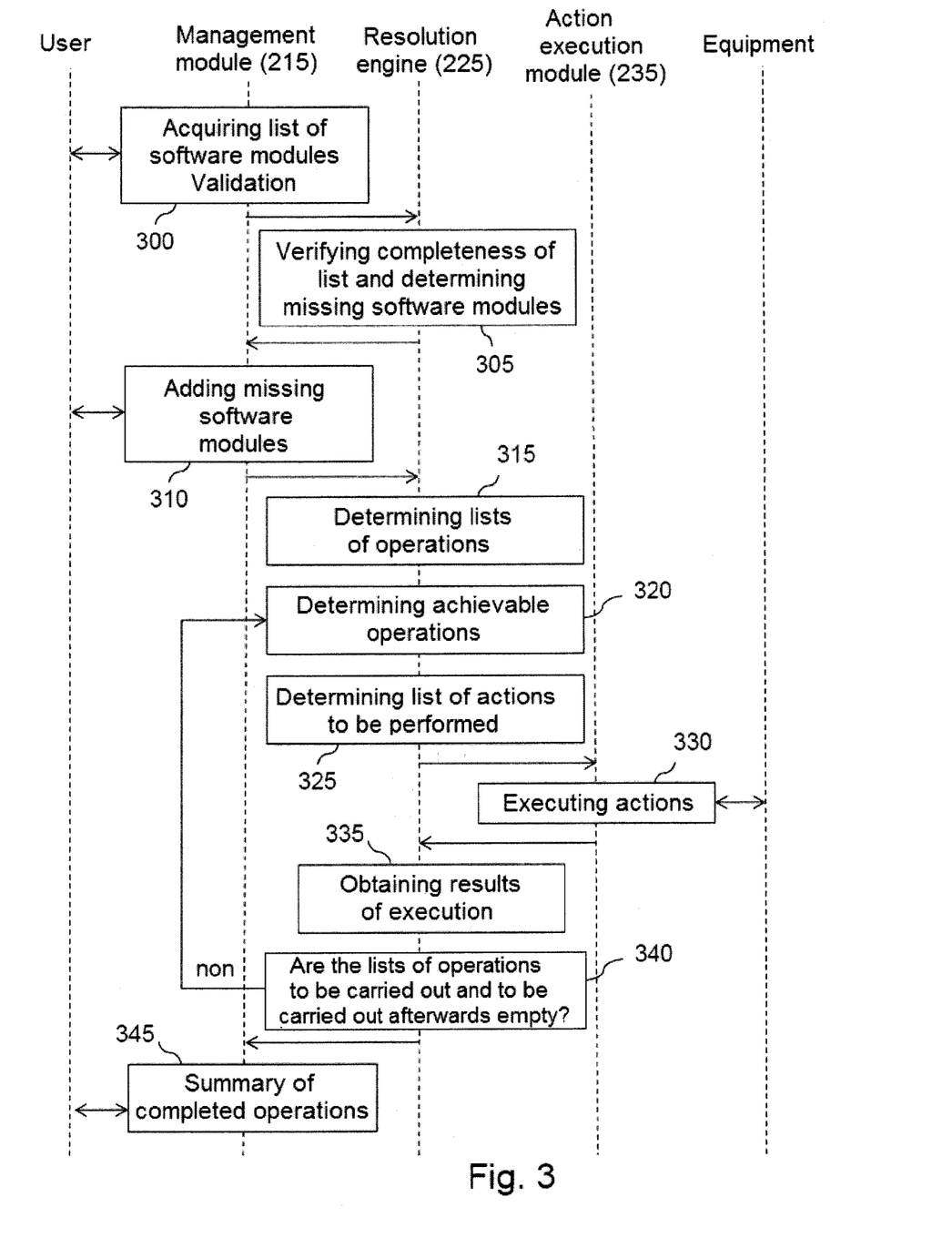
FIG. 3 shows diagrammatically a sequence of steps implemented according to a particular embodiment for carrying out an operation of remote loading of software modules onto equipment.

FIG. 3 shows diagrammatically a sequence of steps implemented according to a particular embodiment for carrying out an operation of remote loading of software modules onto equipment.

As shown, a first step (step 300) has the purpose of acquiring and validating a list of software modules to be installed, at least one identifier of an item of equipment onto which a software module must be installed being associated with each of said software modules. Such a step is implemented here in the management module 215 and involves a user via the interface 220.

The list of software modules is then transmitted to the resolution engine 225, which verifies the completeness thereof (step 305) and, if necessary, determines the missing software modules based on information contained in the software modules themselves and the resolution rules contained in the database 230.

If software modules are missing from the list, the resolution engine 225 sends a message comprising, preferably, a list of missing necessary software modules, to the management module 215. The latter can then query a user, via the interface 220, in order to obtain confirmation of the addition of the missing software modules to the list of software modules for remote loading, established by a user (step 310).

Based on the list of software modules for remote loading established by a user, completed if necessary, following a verification of completeness, lists of operations to be carried out are established by the resolution engine 225 (step 315). As described previously, said lists are established depending on the software modules for remote loading and the resolution rules. Typically, they include a list of operations to be done and a list of operations to be performed afterwards.

The list of the operations that can be carried out is then determined (step 320). Said list is established from the list of the operations to be done and the resolution rules.

The operations that can be carried out are then broken down into actions that can be executed in parallel or not as indicated in the resolution rules (step 325). Execution of said actions, controlled by the resolution engine 225, is performed by the actions execution module 235, by agents specific to the equipment involved. Thus, the actions execution module 235, via its agents, drives the carrying out of the actions on the different items of equipment.

The actions execution results are transmitted by the actions execution module 235 to the resolution engine 225 (step 335), which updates the list of operations to be carried out, the list of achievable operations and a list of completed operations. The lists of operations to be carried out and that are achievable are in particular updated according to the completed operations and the operations to be carried out afterwards.

A test is then performed for determining if the lists of operations to be carried out and to be carried out afterwards are empty (step 340). If this is not the case, the previous steps are repeated as shown. Otherwise, the management module 215 creates a summary of the completed operations, which is preferably stored and sent to a user (step 345).

During the verification of the completeness of the list of operations to be carried out, the status of said operations and of the actions implemented by them is advantageously verified.

According to a particular embodiment, the possible statuses of an operation in the centralized loading system are the following:

operation unknown: the descriptor of the operation is not available either in a storage area known as a repository containing the software modules installed in the aircraft (which can be used by the centralized loading system for updating equipment) or on media such as a CD-ROM (Compact Disc-Read Only Memory) or a DVD (Digital Versatile Disc);

operation available: the descriptor of the operation is available in the repository or on media;

operation feasible: the operation is available, the operations to be done beforehand and afterwards are feasible and the actions from the list of corresponding actions are feasible (each action on the list is feasible);

operation achievable: the operation is feasible, the operations to be done beforehand are complete and the actions from the list of corresponding actions are achievable:

operation complete: the actions from the list of corresponding actions have been performed or a condition of the "skip/condition" type is verified; and operation finalized: the operation has been completed and the operations to be carried out afterwards are complete.

Still according to a particular embodiment, the possible statuses of an action in the centralized loading system are the following:

action unknown: the descriptor of the agent for the action is not available in the repository or on the media;

action available: the descriptor of the agent for the action is available in the repository or on the media;

action feasible: the action is available and the operation for installing the corresponding agent, allowing the action to be executed, is feasible; and action achievable (an achievable action implies that it is feasible): the agent allowing the execution of the action is installed in the centralized loading system.

By way of illustration, it is assumed here that a user's task is to update two items of equipment E1 and E2 on board an aircraft by remote loading of software modules (software modules E1_loadA and E1_loadB on the equipment E1 and software module E2_loadC on the equipment E2).

It is also assumed that such an update requires a previous action to configure an item of equipment E3 to a maintenance mode, then an action for reconfiguring said item of equipment to a normal use mode and a final action of resetting the system.

The action of configuring the equipment E3 to a maintenance mode, carried out by a software module E3_loadD, must take place before any installation performed on the equipment E2. Similarly, the action of configuring the equipment E3 to normal mode, also carried out by the software module E3_loadD, must be carried out after any maintenance intervention performed on the equipment E2.

For the action of configuring the equipment E3 to be available, it is necessary for an agent allowing an item of equipment to be interfaced to be installed on the centralized loading system. Such an agent is here contained in a software module CLS_loadE. It is also necessary for a corresponding module, here contained in the software module E3_loadD, to be installed on the equipment E3. As a result, the software module E1_loadA must be installed after the software modules CLS_loadE, E3_load D.

The final action of resetting the system is here contained in the software module E4_loadF that must be installed on an item of equipment E4. Again, for said action to be available, it is necessary for an agent allowing an item of equipment to be interfaced (here contained in the software module CLS_loadE) to be installed on the centralized loading system. It is also necessary for a corresponding module, here contained in the software module E4_loadF, to be installed on the equipment E4.

Furthermore, it is considered that the software module E1_loadA must be installed before the software module E1_loadB and that the latter must be uninstalled before the software module E1_loadA.

Table 3 given in the annex shows an example software module E1_loadA. As shown, the software module E1_loadA is associated with a particular target item of equipment (E1) and comprises two descriptors, one for installation (E1_loadA installation operation) and the other for uninstallation (E1_loadA uninstallation operation), as well as the software application. Similar tables can represent the software modules E1_loadB, E2_loadC, E3_loadD and E4_loadF, respectively. Two descriptors, one for installation and the other for uninstallation, can be associated with each of said software modules.

Table 4 given in the annex shows an example software module CLS_loadE. As shown, it comprises both descriptors of operations and descriptors of agents, in particular configuration and resetting agents making it possible to interface items of equipment (here the items of equipment E3 and E4), as well as the software code corresponding to said agents.

Tables 5a and 5b given in the annex show an example of resolution rules of the installation and uninstallation operations associated with the software module E1_loadA, respectively. Similar tables can be used to represent the resolution rules of the operations of installation and uninstallation associated with software modules E1_loadB, E2_loadC, E3_loadD and E4_loadF.

Tables 6a, 6b and 6c given in the annex show an example of resolution rules of the operations of resetting, installation and uninstallation associated with the software module CLS_loadE, respectively.

When the user wishes to update the equipment E1 and E2, the operational software of the centralized loading system (CLS) is installed, thus making available the actions of installation of software modules (marked CLS_install), uninstallation of software modules (marked CLS_uninstall) and actions of interaction with a user. The corresponding software module is here available in the repository. No other software module is available in the repository and as a result the CLS does not propose any additional operation.

To update the items of equipment E1 and E2, here the user has a DVD that contains the following software modules:

E1_loadA;
E1_loadB;
E2_loadC;
E3_loadD;
CLS_loadE; and
E4_loadF.

When the user inserts his DVD in the drive, the resolution engine reads its content to, in particular, determine the operations and actions available therefrom.

According to this example, the following operations (defined in the software modules) are available:

E1_loadA installation, E1_loadB installation, E2_loadC installation, E3_loadD installation, CLS_loadE installation and E4_loadF installation;

E1_loadA uninstallation, E1_loadB uninstallation, E2_LoadC uninstallation, E3_loadD uninstallation, CLS_loadE uninstallation and E4_LoadF uninstallation; and resetting of the aircraft.

Similarly, the following actions (defined in the software modules) are available:

actions available:
configuration action;
resetting action; and
actions of interaction with the user;
feasible actions:
CLS_Install; and
CLS_Uninstall.

The steps implemented to update the items of equipment E1 and E2 then conform to those described with reference to FIG. 3.

Firstly, the list of the software modules for remote loading is obtained by the management module. According to the scenario of the example in question here, a user selects the following software modules: E1_loadA, E1_loadB and E2_loadC.

The management module then communicates said list to the resolution engine so that it can verify the completeness of the list and determine the missing software modules and the feasibility of the operations to be carried out.

During this analysis, the resolution engine determines that software modules CLS_loadE and E3_loadD are missing. The analysis can be summarised as shown in Table 7 given in the annex.

In a next step, the resolution engine communicates to the management module the list of missing software modules, i.e., here, a list comprising software modules CLS_loadE and E3_loadD. The management module proposes said list to the user who then updates the list of the software modules to install. The list then comprises the following software modules: E1_loadA, E1_loadB, E2_loadC, CLS_loadE and E3_LoadD.

The resolution engine then verifies the new list, which is then complete and feasible as it results from the analysis presented in Table 7, then calculates the list of operations to be carried out and operations to be carried out afterwards.

The list of operations to be carried out here comprises the following operations: E1_loadA installation, E1_loadB installation, E2_loadC installation, CLS_loadE installation and E3_loadD installation. The list of operations to be carried out afterwards comprises only the resetting of the aircraft.

The resolution engine then determines the achievable operations, verifying that the operations to be done beforehand are complete and that the list of the actions is achievable. Table 8 given in the annex gives this step. All the operations are executed under the control of the resolution engine, which then executes the operation of resetting the aircraft.

Figure 4:
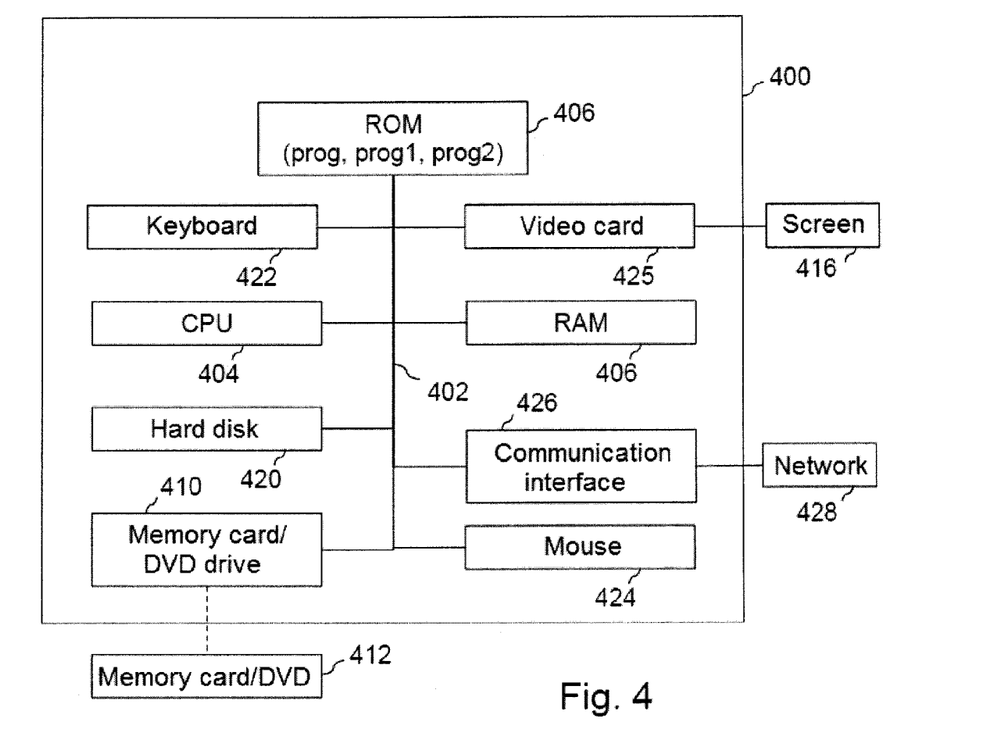
FIG. 4 shows an example information processing device suitable for at least partially implementing an embodiment.

FIG. 4 shows an example of a device that can be used to implement an embodiment at least partially, particularly the steps described with reference to FIGS. 2 and 3. The device 400 is for example a server.

The device 400 preferably contains a communication bus 402 to which the following are connected:
 a Central Processing Unit (CPU) or microprocessor 404;
 a Read Only Memory (ROM) 406, which can contain the operating system and programs such as "Prog";
 a random storage or cache memory 408 (Random Access Memory (RAM)) comprising registers suitable for recording variables and parameters created and modified during the execution of the aforementioned programs;
 a drive 410 of a detachable storage media 412 such as a memory card or a disk, for example a DVD; and
 a graphics card 414 connected to a screen 416.

Optionally, the device 400 can also have the following components:
 a hard disk 420 that can contain the aforementioned programs "Prog" and data processed or for processing according to the invention;
 a keyboard 422 and a mouse 424 or any other pointing device such as a light pen, touch screen or remote control enabling the user to interact with the programs according to the invention, in particular for selecting items of equipment and software modules to be installed and/or uninstalled; and
 a communication interface 426 connected to a distributed communication network 428, for example the AFDX™ (Avionics Full DupleX) network, the interface being suitable for transmitting and receiving data, in particular to and from an item of equipment of an aircraft.

The communication bus allows communication and interoperability between the different elements included in the device 400 or associated therewith. The representation of the bus is non-limitative and, in particular, the central unit is capable of communicating instructions to any element of the device 400 directly or via another element of the device 400.

The executable code of each program enabling the programmable device to implement the processes according to the invention can be stored, for example, on the hard disk 420 or in the ROM 406.

According to a variant, the executable code of the programs can be received by means of the communication network 428 via the interface 426, to be stored in the same way as previously described.

More generally, the program(s) can be loaded onto one of the storage means of the device 400 before being executed.

The central processing unit 404 will control and manage the execution of the instructions or portions of software code of the program(s) according to the invention, instructions which are stored on the hard disk 420 or in the read only memory 406 or in the other aforementioned storage elements. When powered up, the program(s) that are stored in a non-volatile memory, for example the hard disk 420 or the read only memory 406, are transferred to the random access memory 408, which then contains the executable code of the program(s) according to the invention, as well as the registers for storing the variables and parameters necessary for implementation of the invention.

Naturally, to meet specific needs, a person skilled in the art of the invention could modify the above description. The present invention is not limited to the embodiments described; other variants and combinations of features are possible.

The present invention has been described and illustrated in the present detailed description with reference to the attached figures. However, the present invention is not limited to the embodiments given herein. Other variants and embodiments may be deduced and implemented by a person skilled in the art of the invention on reading the present description and the attached figures.

In the claims, the verb "to comprise" does not exclude other elements or other steps. The singular indefinite article does not exclude the plural. A single processor or several other units can be used to implement the invention. The different features presented and/or claimed can be advantageously combined. Their presence in the description or in different dependent claims in no way excludes the possibility of combining them. The reference signs should not be understood as limiting the scope of the invention.

ANNEX

TABLE 1 example of resolution rules of an operation

Operation: remote loading of software module A onto equipment X
Operations to be carried out beforehand: uninstall software module B from equipment X
List of actions:
    user confirmation: open relay Z?
    open relay Z
    install software module A on equipment X
    [...]
    close relay Z
Operations to be carried out afterwards: reset aircraft
List of conditions and constraints:
    skip/condition: software module A installed on equipment X
    non-parallel

TABLE 2 example of software module

Software module: X_loadA
Target: X
Descriptor of operation:
    remotely load software module A on equipment X

TABLE 2-continued example of software module uninstall software module A from equipment X
Software application

TABLE 3 software module E1_loadA

Software module: E1_loadA
Target: E1
Descriptor of operation:
    E1_loadA installation operation
    E1_loadA uninstallation operation
        Software application

TABLE 4 software module CLS_loadE

Software module: CLS_loadE
Target: CLS
Descriptor of operation:
    aircraft reset operation
    CLS_loadE installation operation
    CLS_loadE uninstallation operation
Descriptor of agent:
    configuration agent
    reset agent
        Configuration agent software application
        Reset agent software application

TABLE 5a resolution rules of the E1_loadA installation operation

Operation: E1_loadA installation operation
Operations to be carried out beforehand: none
List of actions:
    action user confirmation: E4 maintenance mode configuration?
    action E4 maintenance mode
    action CLS_install E1_loadA on E1
    action user confirmation: E4 normal mode configuration?
    action E4 normal mode
Operations to be carried out afterwards: aircraft reset operation
List of conditions and constraints:
    skip/condition: software module E1_loadA installed on E1
    non-parallel

TABLE 5b resolution rules of the E1_loadA uninstallation operation

Operation: E1_loadA uninstallation operation
Operations to be carried out beforehand: E1_loadB uninstallation operation
List of actions:
    action user confirmation: E4 maintenance mode configuration?
    action E4 maintenance mode
    action CLS_uninstall E1_loadA on E1
    action user confirmation: E4 normal mode configuration?
    action E4 normal mode
Operations to be carried out afterwards: none
List of conditions and constraints:
    skip/condition: software module E1_loadA not installed on E1
    non-parallel

TABLE 6a resolution rules of the aircraft reset operation

Operation: aircraft reset operation
Operations to be carried out beforehand: none
List of actions:
    action user confirmation: aircraft reset?
    action reset
Operations to be carried out afterwards: none
List of conditions and constraints:
    skip/condition: NA
    non-parallel

TABLE 6b resolution rules of the CLS_loadE installation operation

Operation: CLS_loadE installation operation
Operations to be carried out beforehand: E3_loadD installation operation
List of actions:
    action CLS_install CLS_loadE on CLS
Operations to be carried out afterwards: none
List of conditions and constraints:
    skip/condition: software module CLS_loadE installed on CLS
    parallel supported

TABLE 6c resolution rules of the CLS_loadE uninstallation operation

Operation: CLS_loadE uninstallation operation
Operations to be carried out beforehand: none
List of actions:
    action CLS_uninstall CLS_loadE on CLS
Operations to be carried out afterwards: none
List of conditions and constraints:
    skip/condition: software module CLS_loadE not installed on CLS
    parallel supported

TABLE 7 example analysis of the feasibility of operations to performed

| Decisions taken by the resolution engine | Description of the Resolution |
|---|---|
| | Operation to be carried out: E1_loadA installation operation |
| 1. Is E1_loadA installation operation feasible? | Is the operation available? YES<br>Are operations to be done beforehand feasible? NA<br>Is the list of actions feasible?<br>Is user confirmation action feasible? YES<br>Is configuration action feasible?<br>see decision number 2 → YES *<br>Is CLS_install action feasible? YES<br>Are operations to be done afterwards feasible?<br>Is aircraft reset feasible?<br>see decision number 5 → YES<br>E1_loadA installation operation is feasible * |
| 2. Is configuration action feasible? | Is configuration action available? YES<br>Is the operation to install the agent feasible?<br>Install the software module containing the configuration action agent (=load CLS_loadE)<br>Update the list of the missing software modules, comprising CLS_loadE<br>Verify that the CLS_loadE installation operation is feasible?<br>see decision number 3 → YES *<br>Action A is feasible |
| 3. Is CLS_LoadE installation operation feasible? | Is the operation available? YES<br>Are operations to be done beforehand feasible?<br>Is E3_loadD installation operation feasible?<br>see decision number 4 → YES |

TABLE 7-continued example analysis of the feasibility of operations to performed

| Decisions taken by the resolution engine | Description of the Resolution |
|---|---|
| 4. Is E3_loadD installation operation feasible? | Update the list of missing software modules, comprising CLS_loadE and E3_loadD<br>Is the list of actions feasible?<br>Action CLS_install is feasible<br>Are operations to be done afterwards feasible? NA<br>CLS_LoadE installation operation is feasible<br>Is the operation available? YES<br>Are operations to be done beforehand feasible? NA<br>Is the list of actions feasible?<br>Action CLS_install is feasible<br>Are operations to be done afterwards feasible? NA<br>E3_loadD installation operation is feasible |
| 5. Is the aircraft reset operation feasible? | Is the operation available? YES<br>Are operations to be done beforehand feasible? NA<br>Is the list of actions feasible?<br>Is the reset action feasible?<br>see decision number 6 → YES *<br>Are operations to be done afterwards feasible? NA<br>Aircraft reset operation is feasible |
| 6. Is the reset action feasible? | Is Action B available? YES<br>Is the operation to install the agent feasible?<br>Install the software module containing the reset action agent (=load CLS_loadE)<br>The list of missing software modules contains Load CLS_loadE<br>Verify that the CLS_loadE installation operation is feasible?<br>see decision number 3 → YES<br>The reset action is feasible |
| | Operation to be carried out: E1_LoadB installation operation |
| 7. Is E1_loadB installation operation feasible? | Is the operation available? YES<br>Are operations to be done beforehand feasible?<br>Is E1_loadA installation operation feasible?<br>see decision number 1 → YES<br>Is the list of actions feasible?<br>Is action CLS_install feasible? YES<br>Are operations to be done afterwards feasible?<br>Is aircraft reset feasible?<br>see decision number 5 → YES<br>E1_loadB installation operation is feasible |
| | Operation to be carried out: E2_loadC installation operation |
| 8. Is E2_loadC installation operation feasible? | Is the operation available? YES<br>Are operations to be done beforehand feasible? NA<br>Is the list of actions feasible?<br>Is action CLS_install feasible? YES<br>Are operations to be done afterwards feasible? NA<br>E2_loadC installation operation is feasible |

The feasibility of the operation is based on the assumption that the user selects the list of missing software modules requested by the centralized loading system.

TABLE 8 determination of the achievable operations

| Operations to be done and achievable | Operations to be done but not achievable | Operations completed | Comments |
|---|---|---|---|
| E1_loadA installation<br>E1_loadB installation<br>E2_loadC installation<br>CLS_loadE installation<br>E3_loadD installation | | None | Initial status |
| E2_loadC installation<br>E3_loadD installation | E1_loadA installation<br>E1_loadB installation<br>CLS_loadE installation | | E2_loadC and E3_loadD can be installed, for the others, operations to be done beforehand or actions are not available |
| Carrying out the actions | | | |
| E1_loadA installation<br>E1_loadB installation<br>CLS_loadE installation | | E2_loadC installation<br>E3_loadD installation | E2_loadC and E3_loadD have been installed in parallel |
| Evaluation of the achievable operations | | | |
| CLS_loadE installation | E1_loadA installation<br>E1_loadB installation | E2_loadC installation<br>E3_loadD installation | The installation of CLS_loadE becomes achievable because E3_loadD has been installed |
| Carrying out the actions | | | |
| E1_loadA installation<br>E1_loadB installation | | E2_loadC installation<br>E3_loadD installation<br>CLS_loadE installation | CLS_loadE has been installed |
| Evaluation of the achievable operations | | | |
| E1_loadA installation | E1_loadB installation | E2_loadC installation<br>E3_loadD installation<br>CLS_loadE installation | The configuration action is available following the installation of CLS_loadE, therefore E1_loadA can be installed |
| Carrying out the actions | | | |
| E1_loadA installation<br>E1_loadB installation | | E2_loadC installation<br>E3_loadD installation<br>CLS_loadE installation<br>E1_loadA installation | E1_loadA has been installed. |
| Evaluation of the achievable operations | | | |
| E1_loadB installation | | E2_loadC installation<br>E3_loadD installation<br>CLS_loadE installation<br>E1_loadA installation | The installation of E1_loadB becomes achievable because E1_loadA has been installed |
| Carrying out the actions | | | |
| | | E2_loadC installation<br>E3_loadD installation<br>CLS_loadE installation<br>E1_loadA installation<br>E1_loadB installation | E1_loadB has been installed Stop condition reached because the list to be done and achievable is empty |

TABLE 8-continued determination of the achievable operations

| Operations to be done and achievable | Operations to be done but not achievable | Operations completed | Comments |
|---|---|---|---|
| | | installation E1_loadB installation | |

During the E1_loadA installation operation, the configuration actions that require confirmation from the operative must be carried out.

The invention claimed is:

1. A system, comprising:
   (a) a plurality of items of equipment each having one or more loading modules;
   (b) a central loading system including:
      (i) a human-machine interface;
      (ii) a database of resolution rules;
      (iii) a management module configured for receiving, from the human-machine interface, a selection of a list of software modules for remote loading onto each of the plurality of items of equipment;
      (iv) a resolution engine configured for accessing resolution rules from the database, based on the selection of the list of software modules, for remote loading onto each of the plurality of items of equipment, wherein the resolution rules include a list of first operations carried out prior to any action being performed, a list of actions, a list of second operations carried out after every action is performed, and a list of conditions and constraints;
      (v) an actions execution module having a plurality of agent modules, each agent module corresponding to each of the plurality of items of equipment, wherein each agent module is configured for:
         (A) instructing a corresponding item of equipment to execute at least one action from the list of actions using a specific protocol; and
         (B) receiving a status of the at least one action and sending such action to the resolution engine.

2. The system of claim 1, the resolution engine further configured for, upon executing the at least one operation from at least one of the list of first operations and the list of second operations of the listed operations, updating at least one of the list of first operations and the list of second operations.

3. The system of claim 2, the resolution engine further configured for, upon updating at least one of the list of first operations and list of second operations, testing whether the list of first operations and the list of second operations are empty.

4. The system of claim 3, the management module further configured for, upon said testing and determining that the list of first operations and list of second operations are empty, generating a summary of completed operations and sending the summary to a user.

5. A system for the installation of at least one software module on an on-board item of equipment of the system comprising a plurality of on-board equipment, the system having one or more processors configured to:
   (a) receive, by a management module, from a human-machine interface, a selection of a list of software modules for remote loading onto each of a plurality of items of equipment;
   (b) access, by a resolution engine, resolution rules from a database, based on the selection of the list of software modules, for remote loading onto each of the plurality of items of equipment, wherein the resolution rules include a list of first operations carried out prior to any action being performed, a list of actions, a list of second operations carried out after every action is performed, and a list of conditions and constraints;
   (c) instruct, by each agent module of an actions execution module having a plurality of agent modules, each agent module corresponding to each of the plurality of items of equipment, a corresponding item of equipment to execute at least one action from the list of actions using a specific protocol;
   (d) receive, by each agent module of the actions execution module, a status of the at least one action and send such action to the resolution engine.

6. A device for installing, for a centralized loading system, at least one software module on an on-board item of equipment of a system comprising a plurality of on-board items of equipment, the equipment being separate from the centralized loading system, the device comprising a microprocessor configured to run each of the following steps:
   (a) receiving, by a management module, from a human-machine interface, a selection of a list of software modules for remote loading onto each of a plurality of items of equipment;
   (b) accessing, by a resolution engine, resolution rules from a database, based on the selection of the list of software modules, for remote loading onto each of the plurality of items of equipment, wherein the resolution rules include a list of first operations carried out prior to any action being performed, a list of actions, a list of second operations carried out after every action is performed, and a list of conditions and constraints;
   (c) instructing, by each agent module of an actions execution module having a plurality of agent modules, each agent module corresponding to each of the plurality of items of equipment, a corresponding item of equipment to execute at least one action from the list of actions using a specific protocol;
   (d) receiving, by each agent module of the actions execution module, a status of the at least one action and sending such action to the resolution engine.

7. An aircraft comprising a device for installing, for a centralized loading system, at least one software module on an on-board item of equipment of a system comprising a plurality of on-board items of equipment, the equipment being separate from the centralized loading system, the aircraft comprising a microprocessor configured to run each of the following steps:
   (a) receiving, by a management module, from a human-machine interface, a selection of a list of software modules for remote loading onto each of a plurality of items of equipment;
   (b) accessing, by a resolution engine, resolution rules from a database, based on the selection of the list of software modules, for remote loading onto each of the plurality of items of equipment wherein the resolution rules include a list of first operations carried out prior to any action being performed, a list of actions, a list of second operations carried out after every action is performed, and a list of conditions and constraints;
   (c) instructing, by each agent module of an actions execution module having a plurality of agent modules, each agent module corresponding to each of the plurality of items of equipment, a corresponding item of equipment to execute at least one action from the list of actions using a specific protocol;

(d) receiving, by each agent module of the actions execution module, a status of the at least one action and sending such action to the resolution engine.

\* \* \* \* \*